United States Patent [19]
Guertin

[11] 3,817,560
[45] June 18, 1974

[54] QUICK DISCONNECT SWIVEL COUPLING
[75] Inventor: Robert W. Guertin, Cincinnati, Ohio
[73] Assignee: Dover Corporation, New York, N.Y.
[22] Filed: Sept. 5, 1972
[21] Appl. No.: 286,198

[52] U.S. Cl.................. 285/90, 308/216, 285/277
[51] Int. Cl............................................ F16l 15/00
[58] Field of Search ............ 285/276, 277, 90, 315, 285/316; 308/193, 196, 216

[56] References Cited
UNITED STATES PATENTS
2,770,475  11/1956  Rafferty........................... 285/90 X
2,860,893  11/1958  Clark................................ 285/277 X
3,336,057  8/1967   Bloomquist........................ 285/276
3,543,367  12/1970  Arnot................................ 308/216

Primary Examiner—Dave W. Arola
Attorney, Agent, or Firm—John G. Schenk

[57] ABSTRACT

A quick disconnect swivel coupling for cooperatively connecting two members in rotatable fashion is disclosed. The one member carries a pair of race rings forming a ball race. The second member carries a plurality of balls for cooperative engagement with the race rings. Ball retaining means is mounted on the second member to hold balls in the race in the assembled condition and to permit the balls to be retracted from the race during the uncoupled condition.

12 Claims, 4 Drawing Figures

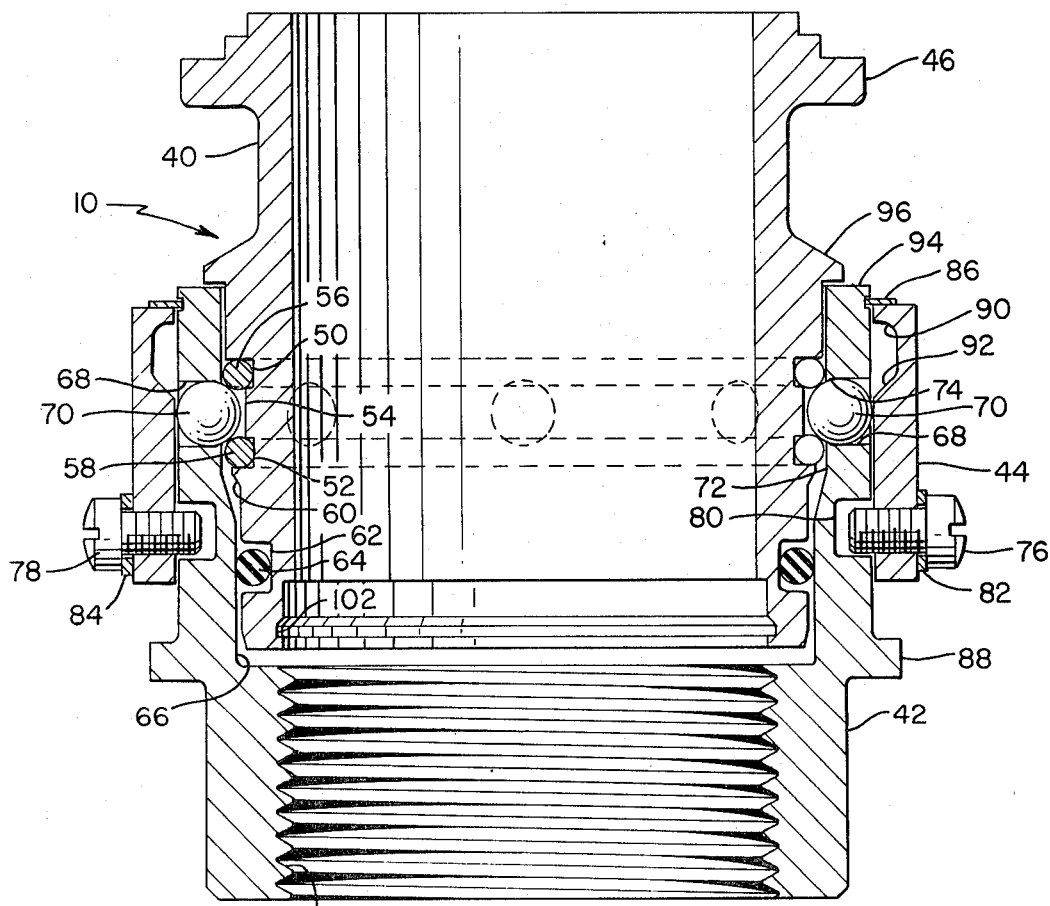
FIG. 2
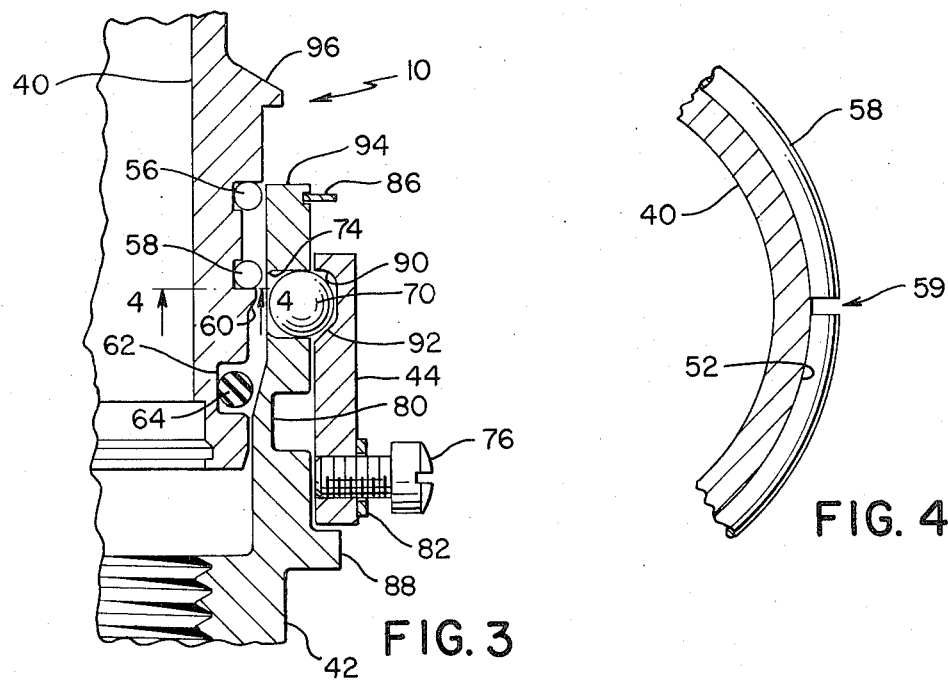
FIG. 3
FIG. 4

3,817,560

QUICK DISCONNECT SWIVEL COUPLING

BACKGROUND OF THE INVENTION

This invention relates generally to couplers and more particularly to a suitable coupling which permits quick disconnect and recoupling of the members.

Swivel couplings are well known in the art. Many such couplings involve the use of ball bearing assemblies. Frequently these assemblies are formed from lightweight material and involve numerous pieces in the assembly. Typical illustrations of such bearing assemblies may be found in U.S. Pat. No. 3,332,728 issued to Gibson and U.S. Pat. No. 3,336,057 issued to Bloomquist. Due to the complex construction of many of the prior ball bearing couplings, quick connecting and disconnecting of the rotatable members is not possible. In addition, many such couplings would not be suitable where axial loading is involved. A further problem when axial loading is present is that one side of the ball race will tend to be disformed, i.e., one edge turns up due to the loading, which prevents disconnecting the rotatable members without excess pressure being applied to the members.

Accordingly, it is an object of this invention to provide a swivel coupling of simple and economical construction which is adapted to carry principally axial loads.

Another object of this invention is to provide a swivel coupling which will permit quick disassembly and assembly of the two members.

A still further object of this invention is to provide a swivel coupling in which the balls are contained even when the coupling is in the uncoupled state.

SUMMARY OF THE INVENTION

This invention provides an improved quick disconnect swivel coupling for rotatably connecting two members. The first member provides a race means and the second member provides a plurality of balls for engaging the race means such that the two members are rotatably connected one to the other. Ball retainer means is provided on the second member for holding the balls into engagement with the race during the assembled condition and for preventing loss of the balls during the uncoupled or disassembled conditions.

Other object, details, uses and advantages of this invention will become apparent as the following description of an exemplary embodiment thereof presented in the accompanying drawings proceeds.

BRIEF DESCRIPTION OF THE DRAWINGS

The accompanying drawings show a present exemplary embodiment of this invention in which:

FIG. 2 is an enlarged view of the swivel coupling in the coupled condition;

FIG. 3 is a fragmentary view similar to FIG. 2 showing the swivel coupling in the uncoupled condition; and FIG. 4 is a fragmentary view taken along the line 4—4 of FIG. 3.

DESCRIPTION OF THE ILLUSTRATED EMBODIMENT

Figure 1:
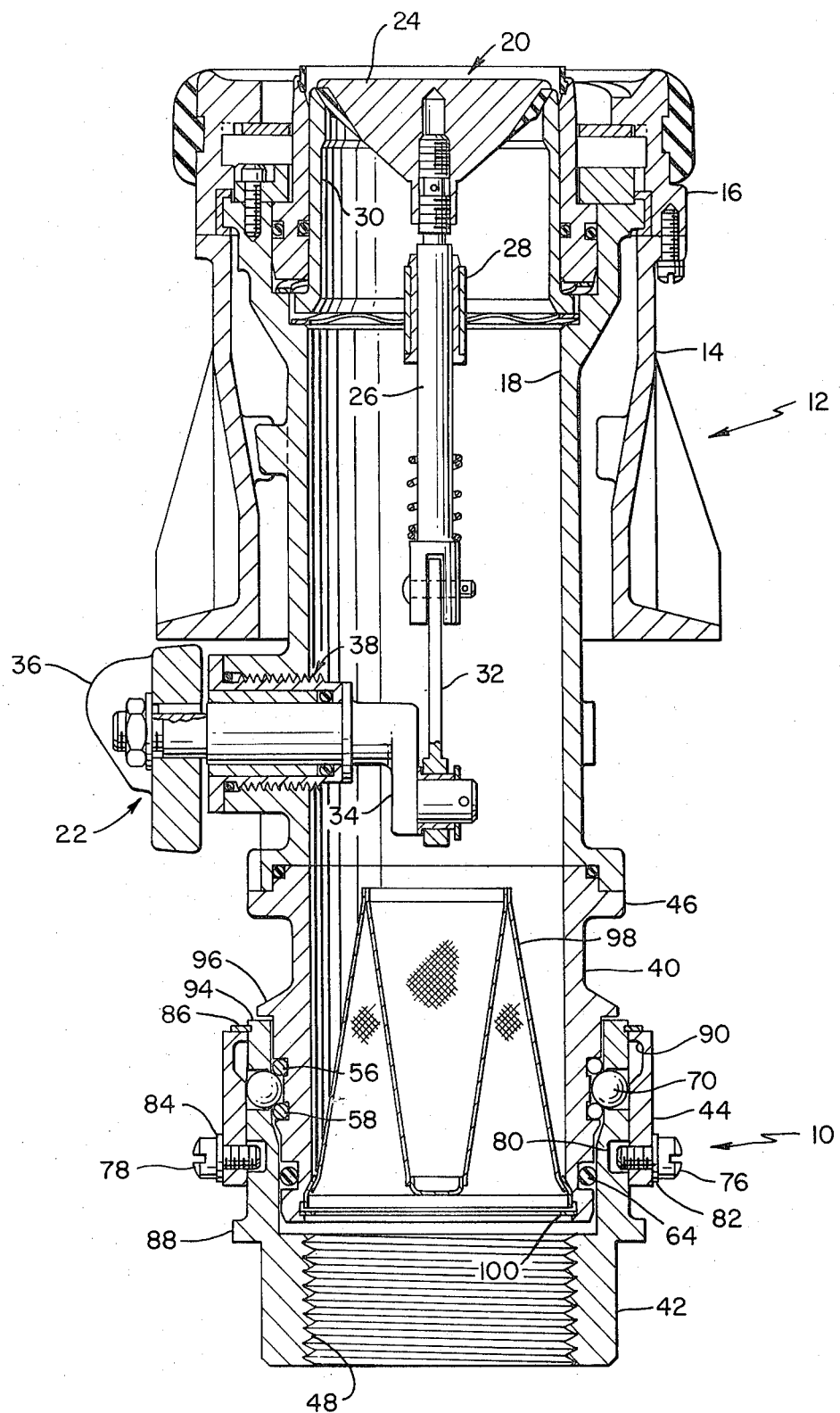
FIG. 1 is a sectional view showing the swivel coupling of this invention in the assembled or coupled condition and attached to a single point refueling nozzle.

Reference is now made to FIG. 1 of the drawings, which illustrates one exemplary embodiment of the improved quick disconnect swivel coupling of this invention, which is designated generally by the reference numeral 10. For purposes of explanation only, the swivel coupling 10 is shown connected to a single point refueling nozzle designated generally as 12. The refueling nozzle 12 is basically comprised of a shroud 14, an outer body 16, a main body 18, a poppet subassembly 20, and a crank assembly 22.

The operational and structural details of the refueling nozzle 12 are fully explained in U.S. Pat. Application Ser. No. 195,173 filed Nov. 3, 1971 for Single Point Refueling Nozzle by Ostand and Guertin and assigned to the same assignee as the present invention. It being sufficient for the present exemplary embodiment to note that the shroud 14 is securedly attached to the outer body 16. The outer body 16 is rotatably mounted with the main body 18. The poppet subassembly 20 comprises a poppet valve 24 and a poppet stem 26. The stem 26 is carried by a suitable yoke 28 for axial movement therealong and the poppet valve 24 seats against a cylinder 30 when in the closed position. The stem 26 is connected through a link 32 to the crank assembly 22. The link 32 connects with a suitable cantilever crank 34 which extends through the wall of the main body 18 and is securedly attached with a handle 36. Suitable glands and seals designated generally as 38 provide a fluid seal to prevent escape of fluid through the main body 18.

Referring now to FIG. 2, the swivel coupling 10 is seen to comprise a first member or swivel tail 40, a second member or swivel body 42 and a ball retaining means or ring 44. The ball retaining ring 44 is mounted for axial movement relative to the swivel body 42 and the swivel body 42 is rotatably mounted relative to the swivel tail 40. The swivel tail 40 is formed with a suitable flange 46 which cooperates with a complementally formed flange on the main body 18 of the refueling nozzle 12, the flanges being secured one to the other by any suitable means. The swivel tail 40 is generally cylindrical in shape having a cylindrical bore therethrough for passage therethrough of the fluid. The swivel body is likewise cylindrival in shape and is formed with an internally threaded bore 48 to cooperatively engage a threaded fuel line (not shown) which supplies pressurized fuel to the refueling nozzle 12.

The swivel tail 40 is formed with a pair of axially spaced recess or grooves 50 and 52 about the exterior peripheral surface. The grooves 50 and 52 are separated by a land 54. A pair of race rings 56 and 58 are mounted in the grooves 50 and 52 and extend completely around such grooves except for small gaps 59 (FIG. 4) where the two ends of each race ring meet. The race rings 56 and 58 may be of any hardened spring wire, such as stainless steel or the like and each wire has a generally circular cross section. The rings 56 and 58 form a ball race as will be explained herebelow. The swivel tail 40 is provided with a protruding lip 60 which extends outwardly beyond the centerline of the race ring 58. The purpose of the extending lip 60 is to prevent the ring 58 from rolling up and possibly out of the groove 52 during uncoupling of the members 40 and 42.

The swivel tail 40 is formed with an external groove 62 axially displaced from the race rings. A suitable seal 64, such as an O-ring or the like, is mounted in the groove 62 to cooperatively engage the internal seal bore 66 of the swivel body 42. Thus, the seal 64 and bore 66 provide a fluid seal when pressurized fluid fuel or the like passes through the coupling 10 and nozzle 12.

The swivel body 42 is provided with a plurality of bores 68 therethrough, each of which carries a ball 70 of suitable material such as stainless steel. Each bore is formed with a lip 74 at the inner edge thereof to cooperatively engage the ball 70 to prevent the ball from passing completely through the bore 68. The inner surface of the swivel body 42 extends outwardly from the seal bore 66 to a clearance bore 72 which is of a slightly greater internal diameter than the external diameter of the race rings 56 and 58. Thus, in the assembled condition shown in FIGS. 1 and 2, the clearance bore 72 is sufficiently large to clear the race rings 56 and 58, as well as the lip 60. The balls 70 are urged into engagement with the race rings 56 and 58 by the inner surface of the ball retainer ring 44 as seen in FIG. 2. The ball retainer ring 44 is held in place relative to the swivel body 42 by a pair of screws or the like 76 and 78 which extend through the ring 44 and protrude into an external groove 80 formed in the swivel body 42. Suitable lock washers or the like 82 and 84, respectively, are mounted on the screws so as to keep the screws from accidental backing off during use. An annular retaining ring 86 is mounted to the swivel body 42 to limit the axial movement of the retaining ring 44 when the screws 76 and 78 are not in engagement with the groove 80. Also, an external flange 88 further limits the axial movement of the ring 44 relative to the body 42. The ball retaining ring 44 is formed with an internal groove 90 having a chamfered surface 92 which is axially displaced from the balls 70 when the member 42 and ring 44 are in the position shown in FIG. 2.

In the assembled condition shown in FIG. 2, it is seen that the members 40 and 42 are rotatably connected one to the other. The balls 70 are held in engagement with the race rings 56 and 58. Thus, the swivel tail 40 and swivel body 42 may be relatively rotated one to the other.

Should it be desired to uncouple the swivel tail 40 from the swivel body 42, it is only necessary to retract the screws 76 and 78 from engagement with the groove 80. When this is done, the retaining ring 44, as seen in FIG. 3, may be moved axially relative to the body 42 until the ring 44 is stopped by the flange 88. In this position, the groove 90 is in alignment with the balls 70. In this position, the balls 70 may move outwardly along the bore 68 so as to clear the outer diameter of the race rings 56 and 58. At this point, the body 42 may be retracted and removed from the swivel tail 40. If a ball 70 should not be moved outwardly prior to the retraction force being applied to the body 42, the initial axial movement of the body 42 relative to the tail 40 will cause an outward force to be applied to the ball 70 by the ring 58 so as to cause the ball 70 to move out of engagement with the ball race.

When it is desired to reassemble the swivel tail 40 and swivel body 42, the two members are axially moved into alignment one to the other. Proper alignment is assured by the end 94 of the swivel body 42 coming into engagement or substantially close to an annular flange 96 on the swivel tail 40. At this point, the bore 68 and balls 70 are aligned with the ball race wires 56 and 58. The ball retaining ring 44 is then moved axially towards the retaining ring 86. The chamfered surface 92 of the groove 90 engages the balls 70 and urges them inwardly towards the race rings 56 and 58. When the retaining ring 44 engages the retaining ring 86, the screws 76 and 78 are aligned relative to the groove 80 such that the screws may be once again tightened so as to engage the groove 80 and hold the retaining ring 44 in place as shown in FIG. 2.

A suitable strainer or the like 98 may be mounted within the swivel tail 40. The strainer 98 is held in place by any suitable retaining ring or the like 100 which is secured in a counterbore 102 as seen in FIGS. 1 and 2.

It can be seen that this invention provides a quick disconnect swivel coupling which has many advantageous features. While the specific embodiment hereinabove described has been specifically described and illustrated with a single point refueling nozzle, it should be understood that the swivel coupling of this invention may be utilized whenever it is desired to provide a quick means for disconnecting two rotatably mounted members. It should be further noted that while point contact is initially made between the balls and the race wires, continued use of the coupling will cause the race rings to slightly conform to the configuration of the balls. This does not in any way detract from the usefulness of the swivel coupling.

The application of the axial force to the race wires may eventually cause the inner point contact surfaces (as viewed in FIG. 2) of the wires to become excessively worn. With the present coupling, it is not necessary to replace the race wires with new wires. It is only necessary to exchange the race wires 56 and 58 one for the other such that the outer surfaces (FIG. 2) will then become the point contact or ball engaging surfaces for the balls 70.

Further, the gap formed in the race ring is not sufficiently large to detract from the bearing surface of the race rings. A sufficient number of balls will be supported by the ring such that any ball bridging the gap will not impair the coupling. Further, any suitable number of balls may be used, this being a design parameter. It is obvious that with different size balls, the race rings will be sized and spaced accordingly.

It is seen that it is only necessary to loosen two screws to permit uncoupling of the rotatably mounted members. When the members are in the uncoupled position, the balls are contained between the one member and the ball retaining ring such that there is no chance of any ball being lost. Accordingly, it is seen that this invention accomplishes the objectives hereinbefore set forth.

While a present exemplary embodiment of this invention has been illustrated and described, it will be recognized that this invention may be otherwise variously embodied and practiced by those skilled in the art.

What is claimed is:

1. A swivel coupling comprising a first generally cylindrical member, said member being formed with a pair of axially spaced apart external grooves, said grooves being separated by a land, a wire mounted in each groove thereby forming an annular race, a second generally cylindrical member adapted to be rotatably connected to and removable from said first member, said second member having an internal diameter greater than the external diameter of said first member for telescopic movement relative to said first member, said second member being formed with a plurality of bores extending transversely therethrough, a ball mounted in each bore and protruding therethrough inwardly to cooperatively engage said race to rotatably couple said first and second members together in the assembled condition, and ball retaining means mounted for axial movement on said second member, said retaining means urging said balls inwardly into engagement with said race in the assembled condition permitting outward movement of said balls away from said race and being retained between said second member and said retaining means when said first and second members are in the disassembled condition.

2. The swivel coupling according to claim 1 in which each race wire is of a generally cylindrical cross section, each wire providing first cooperating ball engaging surfaces when mounted in said grooves and wherein said wires provide second cooperating ball engaging surfaces when each is mounted in the other of said grooves.

3. The swivel coupling according to claim 2 in which each ball receiving bore terminates at the inner end with a ball securing lip to prevent each of said balls from passing therethrough when said first and second members are in the disassembled condition.

4. The swivel coupling according to claim 1 in which said ball retaining means is a cylindrical ring mounted about said second member, and means for limiting the axial movement of said cylindrical ring.

5. The swivel coupling according to claim 4 in which said cylindrical ring is formed with an internal annular groove thereabout wherein said ring annular groove is axially positioned adjacent the second member ball receiving bores when said ring is at one axial position relative to said second member whereby said balls can move outwardly into said ring groove to permit disassembly of said second member from said first member and wherein said ring groove is axially displaced from said ball receiving bore at a second axial position of said ring relative to said second member whereby the inner surface of said ring engages said ball to urge said ball inwardly into engagement with the race means when said first and second members are in the assembled condition.

6. The swivel coupling according to claim 5 in which said second member is formed with an external annular groove, and in which said cylindrical ring is provided with a pair of screws protruding therethrough, said screws engaging said second member annular groove to hold said cylindrical ring in the second axial position, said screws being retracted from said annular groove when it is desired to move the said cylindrical ring from the second axial position to the first axial position.

7. The swivel coupling according to claim 6 further comprising an annular flange formed on said second member to engage said cylindrical ring and limit the axial movement of said cylindrical ring so as to position said groove adjacent the ball receiving bores, and a retaining ring mounted adjacent one end of said second member to limit axial movement of said cylindrical ring in the other direction wherein said screws are aligned with the screw receiving groove when said cylindrical ring is in engagement with said retainer ring.

8. The swivel coupling according to claim 7 in which said cylindrical ring groove is formed with a chamfered surface, said chamfered surface engaging said balls to urge said balls inwardly when said cylindrical ring is moved axially from the first axial position to the second axial position.

9. The swivel coupling according to claim 8 further comprising seal means cooperating between said first member and said second member providing a fluid seal therebetween.

10. The swivel coupling according to claim 9 in which said race wire has a generally cylindrical cross section, and in which each ball receiving bore terminates at the inner end with a ball securing lip to prevent each of said balls from passing therethrough when said first and second members are in the disassembled condition.

11. The swivel coupling according to claim 3 in which said second member inner diameter at the end having the ball receiving bores therein is larger than the external diameter of the race wires wherein clearance is provided between said second member and race wires.

12. The swivel coupling according to claim 10 in which each of said race wires provides first cooperating ball engaging surfaces when mounted in the spaced apart external grooves, said race wires providing second cooperating ball engaging surfaces when each race wire is exchanged one for the other in the external grooves.

* * * * *